(12) United States Patent
Zhao et al.

(10) Patent No.: US 11,387,907 B2
(45) Date of Patent: Jul. 12, 2022

(54) OPTICAL TRANSCEIVER AND OPTICAL COHERENT RECEIVING SYSTEM

(71) Applicant: HUAWEI TECHNOLOGIES CO., LTD., Guangdong (CN)

(72) Inventors: Ping Zhao, Shenzhen (CN); Liangchuan Li, Dongguan (CN); Xinhua Xiao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/229,005

(22) Filed: Apr. 13, 2021

(65) Prior Publication Data

US 2021/0234614 A1 Jul. 29, 2021

Related U.S. Application Data

(63) Continuation of application No. PCT/CN2019/110333, filed on Oct. 10, 2019.

(30) Foreign Application Priority Data

Oct. 13, 2018 (CN) .......................... 201811192395.4

(51) Int. Cl.
*H04B 10/00* (2013.01)
*H04B 10/40* (2013.01)
(Continued)

(52) U.S. Cl.
CPC ............. *H04B 10/40* (2013.01); *H04B 10/25* (2013.01); *H04B 10/503* (2013.01); *H04B 10/61* (2013.01)

(58) Field of Classification Search
CPC .... H04B 10/503; H04B 10/556; H04B 10/40; H04B 10/25; H04B 10/61; H04B 10/505;
(Continued)

(56) References Cited

U.S. PATENT DOCUMENTS

2014/0286651 A1 9/2014 Takechi
2015/0326319 A1* 11/2015 Oki ...................... H04B 10/556
398/135
(Continued)

FOREIGN PATENT DOCUMENTS

CN 104062720 A 9/2014
CN 104218992 A 12/2014
(Continued)

OTHER PUBLICATIONS

Office Action issued in Chinese Application No. 201811192395.4 dated Jun. 3, 2021, 19 pages (with English translation).
(Continued)

*Primary Examiner* — Hibret A Woldekidan
(74) *Attorney, Agent, or Firm* — Fish & Richardson P.C.

(57) ABSTRACT

One example optical transceiver includes an optical interface, an optical receiver, and a polarization-maintaining optical waveguide, where the optical receiver includes a mixer, an optical-to-electrical converter, an analog-to-digital converter, and a digital signal processor. The optical interface is configured to receive first local oscillator light from a laser outside the optical transceiver; the mixer is configured to receive the local oscillator light and receive signal light modulated on laser light; the polarization-maintaining optical waveguide is configured to connect the optical interface and the optical receiver, where a polarization state of the local oscillator light remains unchanged when being transmitted in the polarization-maintaining optical waveguide; the optical-to-electrical converter and an analog-to-digital converter are configured to perform optical-to-electrical conversion and analog-to-digital conversion on the mixed light to obtain a digital electrical signal; and the digital signal processor is configured to process the digital electrical signal to obtain data.

8 Claims, 5 Drawing Sheets

(51) Int. Cl.
*H04B 10/25* (2013.01)
*H04B 10/50* (2013.01)
*H04B 10/61* (2013.01)

(58) Field of Classification Search
CPC ............. H04B 10/532; H04B 10/5561; H04B 10/613; H04B 10/614; H04B 10/63; H04B 10/616; H04B 10/43; H04J 14/06
USPC ........................... 398/135–139, 65, 152, 205
See application file for complete search history.

(56) References Cited

U.S. PATENT DOCUMENTS

2016/0211939 A1  7/2016  Yu et al.
2016/0301475 A1* 10/2016  Li ........................ H04B 10/503

FOREIGN PATENT DOCUMENTS

| CN | 105093433 A | 11/2015 |
| CN | 107466448 A | 12/2017 |
| EP | 0532021 A2 | 3/1993 |
| WO | 2015081501 A1 | 6/2015 |
| WO | 2016164634 A1 | 10/2016 |

OTHER PUBLICATIONS

PCT International Search Report and Written Opinion issued in International Application No. PCT/CN2019/110333 dated Dec. 30, 2019, 17 pages (with English translation).
Extended European Search Report issued in European Application No. 19871564.1 dated Oct. 11, 2021, 10 pages.

* cited by examiner

OPTICAL TRANSCEIVER AND OPTICAL COHERENT RECEIVING SYSTEM

CROSS-REFERENCE TO RELATED APPLICATIONS

This application is a continuation of International Application No. PCT/CN2019/110333, filed on Oct. 10, 2019, which claims priority to Chinese Patent Application No. 201811192395.4, filed on Oct. 13, 2018. The disclosures of the aforementioned applications are hereby incorporated by reference in their entireties.

TECHNICAL FIELD

The present invention relates to the field of communications technologies, and in particular, to an optical transceiver and an optical coherent receiving system.

BACKGROUND

With rapid development of the Internet and fifth-generation mobile communications technologies, as a basic pipeline of a network, an optical communications network has seen explosive growth of traffic. With development of cloud technologies, many large-scale data centers are expanded on a large scale to form a local data center network (DCN). In this network, there is a strong demand for transmission of short-distance ultra-large-bandwidth optical signals. However, a conventional optical transmission technology that focuses on modulation-direct detection has a limited transmission distance, and does not support data center expansion well.

Because of features such as a large bandwidth, a long transmission distance, and strong flexibility, coherent optical signal transmission technologies are widely used in metropolitan area, backbone, and ocean optical communications networks. In a conventional coherent light transmission technology, local oscillator light and signal light have separately independent light sources. Usually, a precise laser needs to be used as the light source, and costs of related optical components are high. In addition, in a conventional coherent optical transmission system, phase noise is large, which increases complexity of a signal processing module in the system and module power consumption. These disadvantages greatly restrict application of the coherent optical transmission technology in the data center network.

SUMMARY

In view of this, embodiments of the present invention provide an optical transceiver and an optical coherent transceiver system, to reduce costs and phase noise.

According to a first aspect, an embodiment of the present invention provides an optical transceiver, including an optical interface, an optical receiver, and a polarization-maintaining optical waveguide, where the optical receiver includes a mixer, an optical-to-electrical converter, an analog-to-digital converter, and a digital signal processor, where the optical interface is configured to receive local oscillator light from a laser outside the transceiver the mixer is configured to: receive the local oscillator light from the optical interface, receive signal light modulated on laser light emitted by the laser outside the transceiver, and mix the local oscillator light and the signal light; the polarization-maintaining optical waveguide is configured to connect the optical interface and the optical receiver, where a polarization state of the local oscillator light remains unchanged when being transmitted in the polarization-maintaining optical waveguide; the optical-to-electrical converter is configured to perform optical-to-electrical conversion on the mixed light to obtain an analog electrical signal that carries data; the analog-to-digital converter is configured to perform analog-to-digital conversion on the analog electrical signal to obtain a digital electrical signal; and the digital signal processor is configured to process the digital electrical signal to obtain the data.

With reference to the first aspect, in a first possible implementation of the first aspect, a semiconductor optical amplifier-polarization controller SOA-PC is connected between the optical interface and the receiver, and the SOA-PC is configured to: receive the local oscillator light emitted by the laser, divide the local oscillator light into second local oscillator light in an X polarization state and third local oscillator light in a Y polarization state, rotate the polarization state of the third local oscillator light by 90 degrees, compare intensity of the second local oscillator light with intensity of rotated third local oscillator light, and select local oscillator light with higher intensity to output to the optical receiver.

With reference to the first possible implementation of the first aspect, in a second possible implementation of the first aspect, that the SOA-PC compares the intensity of the second local oscillator light with the intensity of the rotated third local oscillator light includes: the SOA-PC splits a part of the second local oscillator light and a part of the rotated third local oscillator light based on a fixed proportion by using an optical splitter, and compares the split part of the second local oscillator light and the split part of the rotated third local oscillator light to determine the intensity of the second local oscillator light and the intensity of the rotated third local oscillator light.

With reference to the first possible implementation of the first aspect or the second possible implementation of the first aspect, in a third possible implementation of the first aspect, the optical transceiver further includes a laser, an electro-optic modulator, and a transmitter, where the laser is configured to emit laser light, where a part of the laser light emitted by the laser is used as local oscillator light used for coherent reception by a peer optical transceiver, and another part of the laser light emitted by the laser is used as input light of the electro-optic modulator; the electro-optic modulator is configured to modulate data to the another part of the laser light emitted by the laser to obtain signal light; and the transmitter is configured to send the signal light to the peer optical transceiver.

According to a second aspect, an embodiment of the present invention provides a coherent optical communications system, including a first optical transceiver and a second optical transceiver, where the first optical transceiver includes a first laser, a first electro-optic modulator, and a first optical receiver, the second optical transceiver includes a second laser, a second electro-optic modulator, and a second optical receiver, the first optical receiver includes a first mixer, a first optical-to-electrical converter, a first analog-to-digital converter, and a first digital signal processor, and the second optical receiver includes a second mixer, a second optical-to-electrical converter, a second analog-to-digital converter, and a second digital signal processor; the first laser is configured to transmit a part of emitted laser light to the second mixer as first local oscillator light by using a polarization-maintaining optical waveguide, and transmit another part of the emitted laser light to the first electro-optic modulator, where a polarization state of the first local oscillator light remains unchanged when being transmitted in the polarization-maintaining optical waveguide; the first electro-optic modulator is configured to: load first data onto the laser light received from the first laser to obtain a first optical signal, and transmit the first optical signal to the second mixer by using a first single-mode optical waveguide; the second mixer is configured to mix the first local oscillator light with the first optical signal to obtain a mixed optical signal; the second optical-to-electrical converter is configured to convert the optical signal mixed by the second mixer into a first analog electrical signal; the second analog-to-digital converter is configured to perform analog-to-digital conversion on the first analog electrical signal to obtain a first digital electrical signal; and the second digital signal processor is configured to process the first digital electrical signal to obtain the first data.

With reference to the second aspect, in a first possible implementation of the second aspect, the second laser is configured to: transmit a part of emitted laser light to the first mixer in the first optical transceiver as second local oscillator light by using a polarization-maintaining optical waveguide, and transmit another part of the emitted laser light to the second electro-optic modulator; the second electro-optic modulator is configured to: load second data onto the laser light received from the second laser to obtain a second optical signal, and transmit the second optical signal to the first mixer in the first optical transceiver by using a second single-mode optical waveguide the first mixer is configured to mix the second local oscillator light with the second optical signal to obtain a mixed optical signal; the first optical-to-electrical converter is configured to convert the optical signal mixed by the first mixer into a second analog electrical signal; the first analog-to-digital converter is configured to perform analog-to-digital conversion on the second analog electrical signal to obtain a second digital electrical signal; and the first digital signal processor is configured to process the second digital electrical signal to obtain the second data.

With reference to the second aspect or the first possible implementation of the second aspect, in a second possible implementation of the second aspect, the first laser is connected to the second optical receiver by using a circulator or a wavelength division multiplexer.

With reference to the second aspect or the first possible implementation of the second aspect, in a third possible implementation of the second aspect, a semiconductor optical amplifier-polarization controller SOA-PC is connected between the first laser and the second optical receiver, and the SOA-PC is configured to: receive the first local oscillator light emitted by the first laser, divide the first local oscillator light into third local oscillator light in an X polarization state and fourth local oscillator light in a Y polarization state, rotate the polarization state of the fourth local oscillator light by 90 degrees, compare intensity of the third local oscillator light with intensity of rotated fourth local oscillator light, and select local oscillator light with higher intensity to output to the second optical receiver.

With reference to the third possible implementation of the second aspect, in a fourth possible implementation of the second aspect, that the SOA-PC compares the intensity of the third local oscillator light with the intensity of the rotated fourth local oscillator light includes: the SOA-PC splits a part of the third local oscillator light and a part of the rotated fourth local oscillator light based on a fixed proportion by using an optical splitter, and compares the split part of the third local oscillator light and the split part of the rotated fourth local oscillator light to determine the intensity of the third local oscillator light and the intensity of the rotated fourth local oscillator light.

In the solution of the embodiments of the present invention, a light source of the local oscillator light and a light source of the signal light are a same laser, and bi-directional coherent light transmission is implemented based on homologous coherent detection. In addition, the polarization state of the local oscillator light is effectively maintained by using the polarization-maintaining optical waveguide, which avoids high costs caused by using a precise laser as the light source, reduces phase noise, and prevents a digital signal from being interrupted in a transmission process.

BRIEF DESCRIPTION OF DRAWINGS

To describe the technical solutions in the present invention more clearly, the following briefly introduces the accompanying drawings for describing the implementations. Apparently, the accompanying drawings in the following description show merely some implementations of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
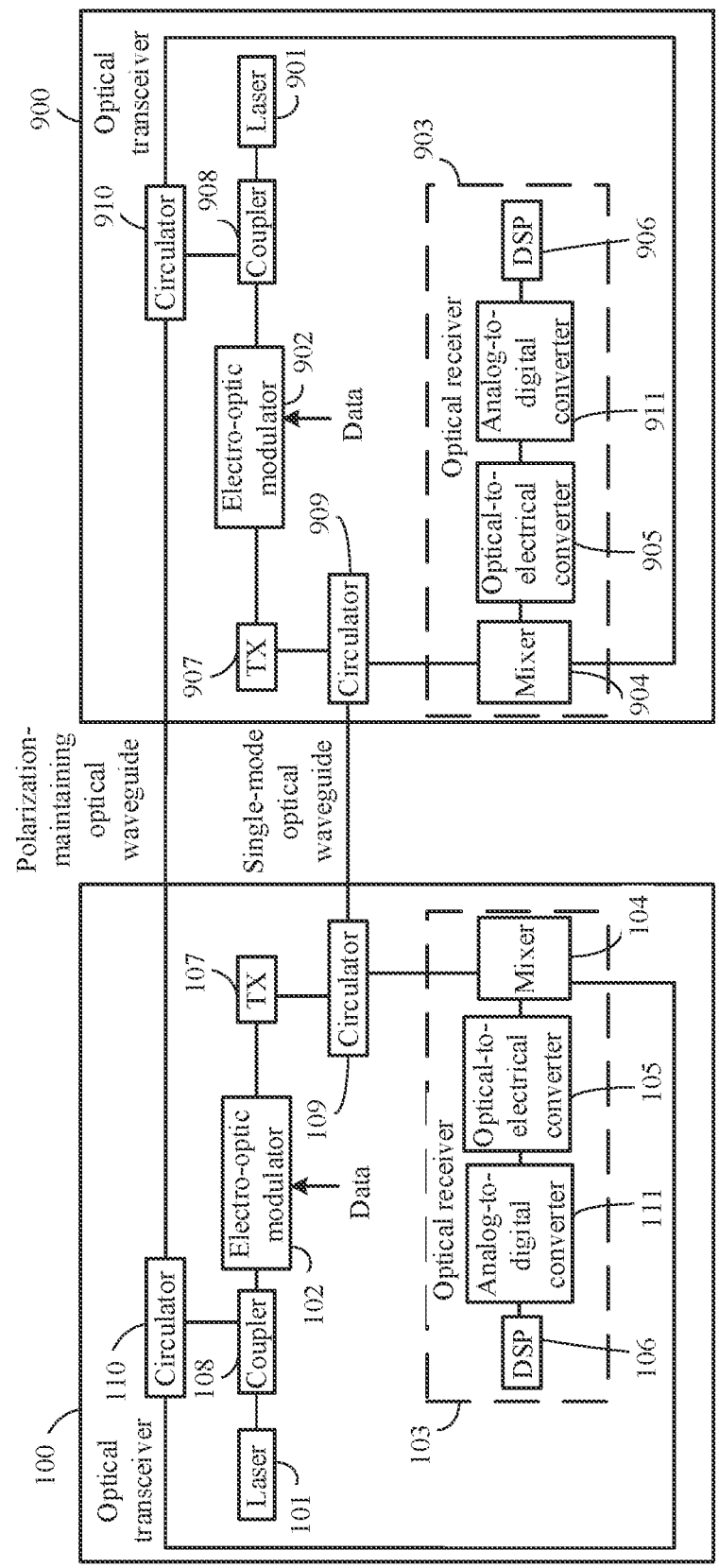
FIG. 1 is a schematic structural diagram of a coherent optical communications system according to an implementation.

FIG. 1 is a coherent optical communications system according to an implementation. The system includes a first optical transceiver 100 and a second optical transceiver 900. The first optical transceiver 100 includes a first laser 101, a first electro-optic modulator 102, and a first optical receiver 103. The second optical transceiver 900 includes a second laser 901, a second electro-optic modulator 902, and a second optical receiver 903, The first optical receiver 103 includes a first mixer 104, a first optical-to-electrical converter 105, a first analog-to-digital converter 111, and a first digital signal processor 106, and the second optical receiver 903 includes a second mixer 904, a second optical-to-electrical converter 905, a second analog-to-digital converter 911, and a second digital signal processor 906. The first laser 101 is configured to transmit a part of emitted laser light to the second mixer 904 as first local oscillator light by using a polarization-maintaining optical waveguide, and transmit another part of the emitted laser light to the first electro-optic modulator 102. The first electro-optic modulator 102 is configured to: load first data onto the laser light received from the first laser 101 to obtain a first optical signal, and transmit the first optical signal to the second mixer 904 by using a first single-mode optical waveguide. The second mixer 904 is configured to mix the first local oscillator light with the first optical signal to obtain a mixed optical signal, and the second optical-to-electrical converter 905 is configured to convert the optical signal mixed by the second mixer 904 into a first analog electrical signal. The second analog-to-digital converter 911 is configured to perform analog-to-digital conversion on the first analog electrical signal to obtain a first digital electrical signal, and the second digital signal processor 906 is configured to process the first digital electrical signal to obtain the first data.

In this implementation, the second laser 901 is configured to: transmit a part of emitted laser light to the first mixer 104 in the first optical transceiver 100 as second local oscillator by using a polarization-maintaining optical waveguide, and transmit another part of the emitted laser light to the second electro-optic modulator 902. The second electro-optic modulator 902 is configured to: load second data onto the laser light received from the second laser 901 to obtain a second optical signal, and transmit the second optical signal to the first mixer 104 in the first optical transceiver 100 by using a second single-mode optical waveguide. The first mixer 104 is configured to mix the second local oscillator light with the second optical signal to obtain a mixed optical signal. The first optical-electrical converter 105 is configured to convert the optical signal mixed by the first mixer into a second analog electrical signal. The first analog-to-digital converter 111 is configured to perform analog-to-digital conversion on the second analog electrical signal to obtain a second digital electrical signal, and the first digital signal processor 106 is configured to process the second digital electrical signal to obtain the second data.

In this implementation, light emitted from the first laser 101 may be transmitted to the electro-optic modulator 102 and a circulator 110 by using a coupler 108, and a part of laser light transmitted to the circulator 110 as local oscillator light of the second optical receiver 903 may be then transmitted to the second mixer 904 by using a circulator 910. Signal light output by the first electro-optic modulator 102 may be transmitted to the second mixer 904 by using a first transmitter 107, a circulator 109, and a circulator 909. Because the first transceiver 100 and the second transceiver 900 are symmetrical, similarly, light emitted from the second laser 901 may be transmitted to the electro-optic modulator 902 and the circulator 910 by using a coupler 908, and a part of laser light transmitted to the circulator 910 as local oscillator light of the first optical receiver 103 may be then transmitted to the first mixer 104 by using the circulator 110. Signal light output by the second electro-optic modulator 902 may be transmitted to the first mixer 104 by using a second transmitter 907, the circulator 909, and the circulator 109.

In this implementation, the polarization-maintaining optical waveguide may be a polarization-maintaining optical fiber, and the single-mode optical waveguide may be a single-mode optical fiber. The polarization-maintaining optical waveguide may alternatively be a polarization-maintaining silicon dioxide waveguide or a polarization-maintaining silicon waveguide.

A semiconductor optical amplifier-polarization controller SOA-PC may further be connected between the first laser and the second optical receiver in this implementation. The SOA-PC is configured to receive the first local oscillator light emitted by the first laser, divide the first local oscillator light into third local oscillator light in an X polarization state and fourth local oscillator light in a Y polarization state, rotate the polarization state of the fourth local oscillator light by 90 degrees, compare intensity of the third local oscillator light with intensity of rotated fourth local oscillator light, and select local oscillator light with higher intensity to output to the second optical receiver.

The SOA-PC splits a part of the third local oscillator light and a part of the rotated fourth local oscillator light based on a fixed proportion by using an optical splitter, and compares the split part of the third local oscillator light and the split part of the rotated fourth local oscillator light to determine the intensity of the third local oscillator light and the intensity of the rotated fourth local oscillator light. The fixed proportion may be 10% or may be another proportion. After the optical splitter performs light splitting based on a proportion of 1:9, based on a result of comparing intensity of 10% of the third local oscillator light with intensity of 10% of the rotated fourth local oscillator light, light with higher intensity from the remaining 90% of the third local oscillator light and the remaining 90% of the rotated fourth local oscillator light is output to the second mixer 904 in the second optical receiver.

The local oscillator light is transmitted by using a polarization-maintaining optical waveguide. Before being transmitted to a receiver, the local oscillator light is processed by an SOA-PC module to perform polarization state locking. The SOA-PC module provides secondary polarization state protection, which can further improve system stability.

Figure 2:
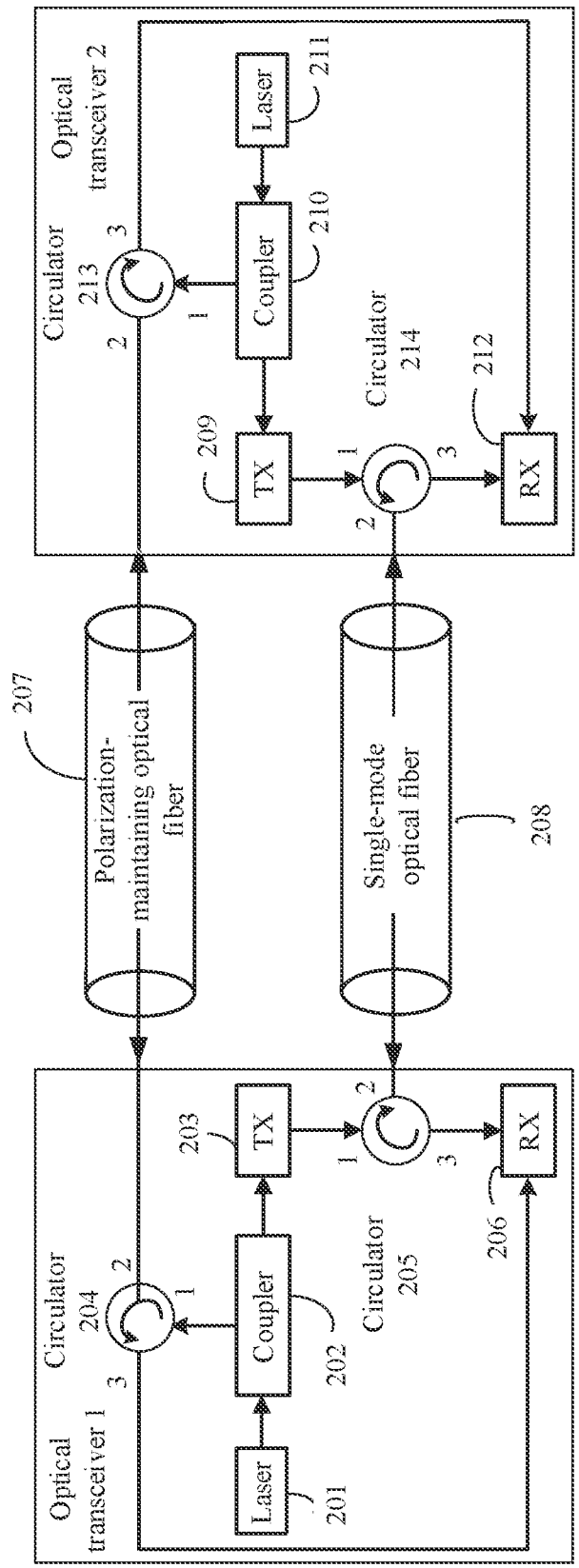
FIG. 2 is a schematic structural diagram of another coherent optical communications system according to an implementation.

Referring to a coherent optical communications system in FIG. 2, in this implementation, an optical circulator is used, and an optical transceiver 1 and an optical transceiver 2 of the coherent optical communications system each use two ports for outputting.

An internal structure of the optical transceiver 1 is mainly as follows: An output port of a laser 201 is connected to an input port of a coupler 202 by using a polarization-maintaining optical fiber. The coupler 202 is a polarization-maintaining optical splitter, and two output ports of the coupler 202 are respectively connected to an input port of an optical transmitter (Transmitter, TX) 203 and a port 1 of a circulator 204 by using a polarization-maintaining optical fiber. An output optical port of the optical transmitter 203 is connected to a port 1 of a circulator 205, and an optical waveguide used for the connection may be a polarization-maintaining optical fiber or a non-polarization-maintaining optical fiber. For example, a single-mode optical fiber is an available non-polarization-maintaining optical fiber. A port 2 of the circulator 205 is connected to a single-mode optical fiber 208. A port 3 of the circulator 205 is connected to a signal optical port of a receiver (Receiver, RX) 206. A port 2 of the circulator 204 is connected to a polarization-maintaining optical fiber 207. A port 3 of the circulator 204 is connected to an local oscillator optical port of the optical receiver 206 by using a polarization-maintaining optical fiber.

A component connection relationship inside the optical transceiver 2 is similar to that of the optical transceiver 1. An output port of a laser 211 is connected to an input port of a coupler 210 by using a polarization-maintaining optical fiber. The coupler 210 is a polarization-maintaining optical splitter, and two output ports of the coupler 210 are respectively connected to an input port of an optical transmitter (Transmitter, TX) 209 and a port 1 of a circulator 213 by using a polarization-maintaining optical fiber. An output optical port of the optical transmitter 209 is connected to a port 1 of a circulator 214, and an optical waveguide used for the connection may be a polarization-maintaining optical fiber or a non-polarization-maintaining optical fiber. For example, a single-mode optical fiber is an available non-polarization-maintaining optical fiber. A port 2 of the circulator 214 is connected to a single-mode optical fiber 208. A port 3 of the circulator 214 is connected to a signal optical port of a receiver (Receiver, RX) 212, A port 2 of the circulator 213 is connected to the polarization-maintaining optical fiber 207. A port 3 of the circulator 213 is connected to an local oscillator optical port of the optical receiver 212 by using a polarization-maintaining optical fiber.

Through the above-mentioned connections, signal light 1 and signal light 2 propagate in a single-mode optical fiber, and local oscillator light 1 and local oscillator light 2 propagate in a polarization-maintaining optical fiber. An output wavelength of the laser 201 and an output wavelength of the laser 211 may be the same or different. A format of an optical signal output by the optical transmitter may be intensity modulation, phase modulation, or frequency modulation. Signal restoration of the receiver corresponds to a modulation format of the transmitter.

The optical circulator in this implementation may be replaced with a wavelength division multiplexer of two wavelengths. When the optical circulator is replaced with the wavelength division multiplexer of two wavelengths, the output wavelength of the laser 201 and the output wavelength of the laser 211 are different. A minimum interval of a wavelength difference between the output wavelength of the laser 201 and the output wavelength of the laser 211 is determined by a spectral bandwidth of an optical signal, which is mainly intended to achieve a purpose of reducing crosstalk between the signal light 1 and the signal light 2.

Figure 3:
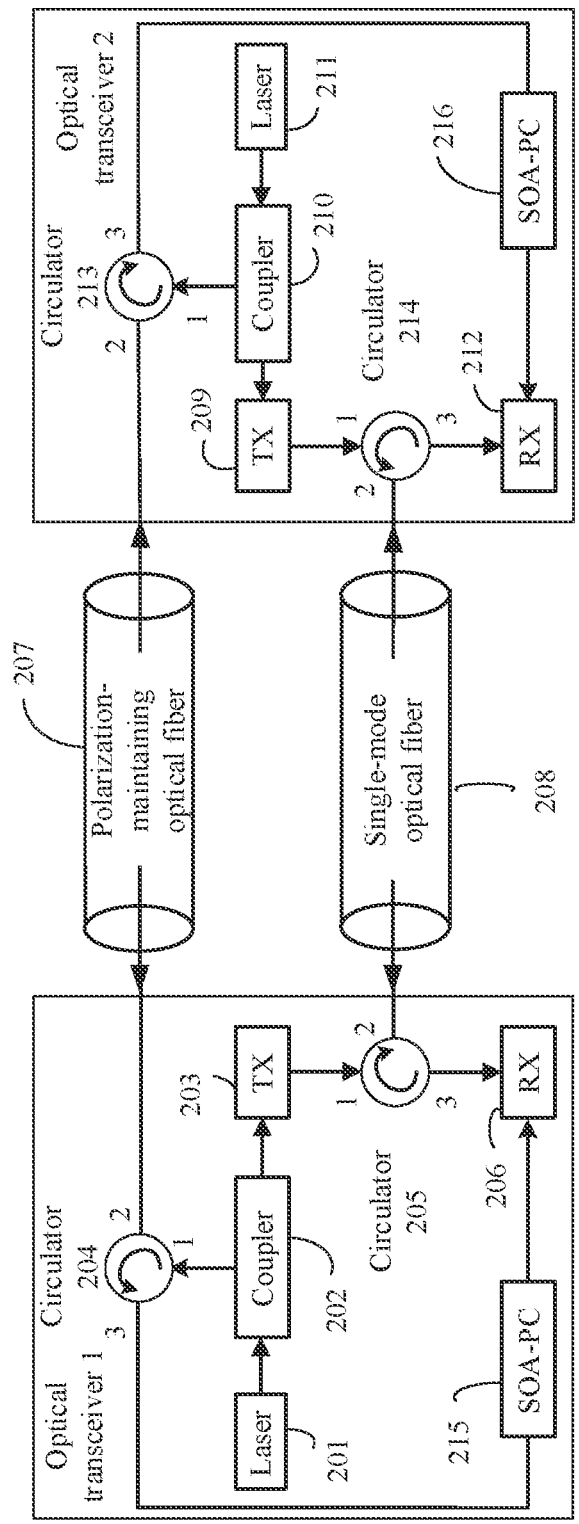
FIG. 3 is a schematic structural diagram of another coherent optical communications system according to an implementation.

Referring to a coherent optical communications system in FIG. 3, in a local oscillator (LO) branch in each optical transceiver, LO light passes through a semiconductor optical amplifier-polarization controller SOA-PC 216 before entering an LO input port of a coherent receiver. Output light of the SOA-PC 216 has constant polarization, which meets a requirement of the LO port of the coherent receiver. A structure of the SOA-PC 216 is shown in FIG. 4.

Figure 4:
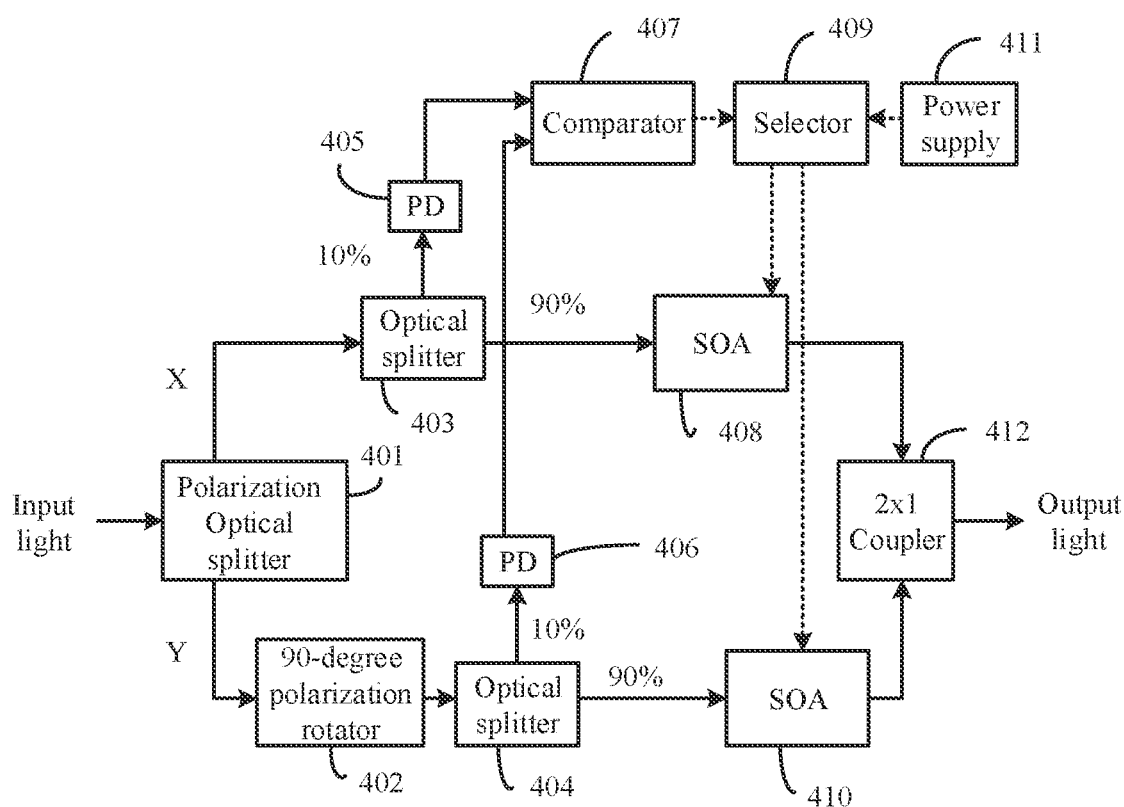
FIG. 4 is a schematic structural diagram of an SOA-PC according to an implementation.

In FIG. 4, input light is continuous laser light with unmodulated data, and is first divided into two polarization branches of X and Y by using a polarization optical splitter 401. Light of the X branch is first divided into two parts through an optical splitter 403: One part enters a photodetector (Photodetector, PD) 405 and is converted into a current, and the other part is transmitted to a semiconductor optical amplifier (Semiconductor optical amplifier, SOA) 408 by using an optical fiber. An output port of the SOA 408 is connected to an input port of a 2×1 coupler 412, Light of the Y branch is first converted into an X polarization state by using a 90-degree polarization rotator 402, and then is connected to another input port of the 2×1 coupler 412 by successively passing through an optical splitter 404 and an SOA 410. In the figure, all optical components and connecting optical waveguides between them are polarization-maintained, that is, polarization-maintaining optical waveguides. A split ratio of the optical splitter 403 is approximately equal to a split ratio of the optical splitter 404, and is typically 10:90. A switching response time of the SOA is short, such as <1 ns, which can be selected based on system specifications. The SOA amplifies optical power. Output of the PD 405 and output of a PD 406 are respectively connected to two ports of a comparator by using waveguides. When a current of the PD 405 is greater than or equal to that of the PD 406, the comparator outputs a high level (such as 5 V); otherwise, outputs a low level (such as 0 V).

A working procedure of the SOA-PC is as follows: When the comparator 407 outputs a high level, a selector 409 enables a drive current of the SOA 408 and disables a drive current of the SOA 410. In some cases, the selector 409 can be connected to a power supply 411. The SOA 408 works normally and outputs an optical wave of the X branch. When the comparator outputs a low level, the selector disables the drive current of the SOA 408 and enables the drive current of the SOA 410. The SOA 410 works normally and outputs an optical wave of the Y branch. In this way, it is ensured that a polarization state of output light of the SOA-PC is always in an X polarization state. A polarization state of input light changes with time, and optical power decomposed into the X and Y polarization states also changes alternately. After the output light passes through the SOA-PC, power of the output optical keeps a high value for most of the time, and the power of the output optical fluctuates in transient switching periods of some SOAs.

Figure 5:
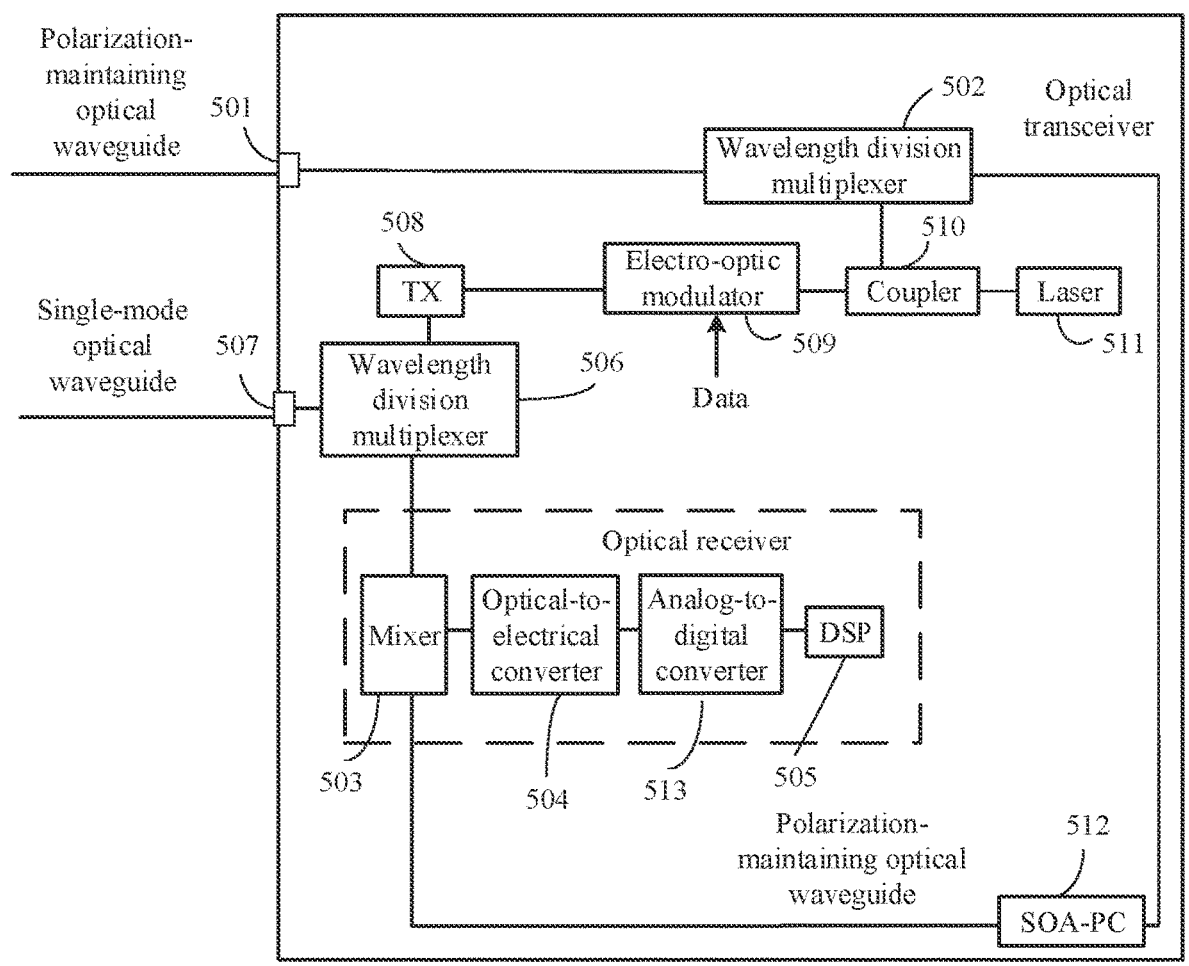
FIG. 5 is a schematic structural diagram of an optical transceiver according to an implementation.

An optical transceiver shown in FIG. 5 includes an optical interface 501, an optical receiver, and a polarization-maintaining optical waveguide. The optical receiver includes a mixer 503, an optical-to-electrical converter 504, an analog-to-digital converter 513, and a digital signal processor DSP 505. The optical interface 501 is configured to receive local oscillator light from a laser outside the transceiver. The mixer 503 is configured to receive the local oscillator light from the optical interface 501 and receive signal light modulated on laser light emitted by the laser outside the transceiver, and mix the local oscillator light and the signal light. The polarization-maintaining optical waveguide is configured to connect the optical interface and the optical receiver, where a polarization state of the local oscillator light remains unchanged when being transmitted in the polarization-maintaining optical waveguide. The optical-to-electrical converter 504 is configured to perform optical-to-electrical conversion on the mixed light to obtain an analog electrical signal that carries data. The analog-to-digital converter 513 is configured to perform analog-to-digital conversion on the analog electrical signal to obtain a digital electrical signal. The digital signal processor 505 is configured to process the digital electrical signal to obtain the data. The signal light received by the mixer 503 may be received from a single-mode optical waveguide by using a port 507, and the signal light received by the port 507 is transmitted to the mixer 503 by using a wavelength division multiplexer 506. The optical transceiver in this implementation may further include a laser 511, an electro-optic modulator 509, a coupler 510, and a transmitter 508. Light emitted by the laser 511 is separately transmitted to a wavelength division multiplexer 502 and the electro-optic modulator 509 by using the coupler 510, and data is loaded, by using the electro-optic modulator 509, to the light transmitted by the coupler 510. Light modulated by the electro-optic modulator is transmitted to a peer optical transceiver by using the transmitter 508, the wavelength division multiplexer 506, and a single-mode optical fiber. After the light emitted by the laser 511 is transmitted to the wavelength division multiplexer 502, the light is transmitted to the peer optical transceiver by using the optical interface 501 and the polarization-maintaining optical waveguide, and is used as local oscillator light used for coherent reception by the peer optical transceiver.

In this implementation, the peer optical transceiver and the local optical transceiver are symmetrical. Light received from the single-mode optical waveguide by the receiver is signal light sent by a transmitter in the peer optical transceiver, and the signal light is obtained after light emitted by a peer laser is loaded with data by an electro-optic modulator in the peer optical transceiver. SOA-PC 512 may be further connected between the wavelength division multiplexer 502 and the mixer 503. Refer to FIG. 4 for a structure of the SOA-PC 512. The SOA-PC 512 is configured to receive the local oscillator light emitted by the laser, divide the local oscillator light into second local oscillator light in an X polarization state and third local oscillator light in a Y polarization state, rotate the polarization state of the third local oscillator light by 90 degrees, compare intensity of the second local oscillator light with intensity of rotated third local oscillator light, and select local oscillator light with higher intensity to output to the optical receiver. That the SOA-PC 512 compares the intensity of the second local oscillator light with the intensity of the rotated third local oscillator light may include: the SOA-PC 512 splits a part of the second local oscillator light and a part of the rotated third local oscillator light based on a fixed proportion by using an optical splitter, and compares the split part of the second local oscillator light and the split part of the rotated third local oscillator light to determine the intensity of the second local oscillator light and the intensity of the rotated third local oscillator light.

In this implementation, waveguides connecting the optical interface 501, the wavelength division multiplexer 502, the SOA-PC 512, and the mixer 503 are polarization-maintaining optical waveguides, such as polarization-maintaining optical fibers.

In the solution of this implementation, a light source of the local oscillator light and a light source of the signal light are a same laser, and bi-directional coherent light transmission is implemented based on homologous coherent detection. In addition, the polarization state of the local oscillator light is effectively maintained by using the polarization-maintaining optical waveguide, which avoids high costs caused by using a precise laser as the light source, reduces phase noise, and prevents a digital signal from being interrupted in a transmission process. The local oscillator light is transmitted by using a polarization-maintaining optical waveguide. Before being transmitted to a receiver, the local oscillator light may be processed by an SOA-PC module to perform polarization state locking. The SOA-PC module provides secondary polarization state protection, which can further improve system stability.

Finally, it should be noted that the foregoing embodiments are merely intended for describing the technical solutions in the present invention but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions in the embodiments of the present invention.

What is claimed is:

1. An optical transceiver, comprising a laser, an electro-optic modulator, an optical interface, an optical receiver, and a polarization-maintaining optical waveguide, wherein the optical receiver comprises a mixer, an optical-to-electrical converter, an analog-to-digital converter, and a digital signal processor, wherein:
the laser is configured to emit laser light, wherein a part of the laser light emitted by the laser is used as local oscillator light used for coherent reception by a peer optical transceiver, and wherein another part of the laser light emitted by the laser is used as input light of the electro-optic modulator;
the electro-optic modulator is configured to modulate data to the another part of the laser light emitted by the laser to obtain signal light;
the optical interface is configured to receive local oscillator light from a laser outside the optical transceiver;
the mixer is configured to:
receive the local oscillator light from the optical interface;
receive signal light modulated on laser light emitted by the laser outside the optical transceiver; and
mix the local oscillator light and the signal light to obtain mixed light;
the polarization-maintaining optical waveguide is configured to connect the optical interface and the optical receiver, wherein a polarization state of the local oscillator light remains unchanged when being transmitted in the polarization-maintaining optical waveguide;
the optical-to-electrical converter is configured to perform optical-to-electrical conversion on the mixed light to obtain an analog electrical signal that carries data;
the analog-to-digital converter is configured to perform analog-to-digital conversion on the analog electrical signal to obtain a digital electrical signal; and
the digital signal processor is configured to process the digital electrical signal to obtain the data.

2. The optical transceiver according to claim 1, wherein a semiconductor optical amplifier-polarization controller (SOA-PC) is connected between the optical interface and the optical receiver, and the SOA-PC is configured to:
receive the local oscillator light emitted by the laser;
divide the local oscillator light into second local oscillator light in an X polarization state and third local oscillator light in a Y polarization state;
rotate the polarization state of the third local oscillator light by 90 degrees;
compare intensity of the second local oscillator light with intensity of rotated third local oscillator light; and
select local oscillator light with higher intensity to output to the optical receiver.

3. The optical transceiver according to claim 2, wherein comparing the intensity of the second local oscillator light with the intensity of the rotated third local oscillator light comprises:
splitting a part of the second local oscillator light and a part of the rotated third local oscillator light based on a fixed proportion by using an optical splitter; and
comparing the split part of the second local oscillator light and the split part of the rotated third local oscillator light to determine the intensity of the second local oscillator light and the intensity of the rotated third local oscillator light.

4. The coherent optical communications system according to claim 1, wherein at least one of:
the first local oscillator light and the second local oscillator light are transmitted in the same polarization-maintaining optical waveguide between the first optical transceiver and the second optical transceiver; or
the first optical signal and the second optical signal are transmitted in the same single-mode optical waveguide between the first optical transceiver and the second optical transceiver.

5. A coherent optical communications system, comprising a first optical transceiver and a second optical transceiver, wherein:

the first optical transceiver comprises a first laser, a first electro-optic modulator, and a first optical receiver, the second optical transceiver comprises a second laser, a second electro-optic modulator, and a second optical receiver, the first optical receiver comprises a first mixer, a first optical-to-electrical converter, a first analog-to-digital converter, and a first digital signal processor, and the second optical receiver comprises a second mixer, a second optical-to-electrical converter, a second analog-to-digital converter, and a second digital signal processor;

the first laser is configured to:
  transmit a part of emitted laser light to the second mixer as first local oscillator light by using a first polarization-maintaining optical waveguide; and
  transmit another part of the emitted laser light to the first electro-optic modulator, wherein a polarization state of the first local oscillator light remains unchanged when being transmitted in the first polarization-maintaining optical waveguide;

the first electro-optic modulator is configured to:
  load first data onto laser light received from the first laser to obtain a first optical signal; and
  transmit the first optical signal to the second mixer by using a first single-mode optical waveguide;

the second mixer is configured to mix the first local oscillator light with the first optical signal to obtain a mixed optical signal;

the second optical-to-electrical converter is configured to convert the mixed optical signal mixed by the second mixer into a first analog electrical signal;

the second analog-to-digital converter is configured to perform analog-to-digital conversion on the first analog electrical signal to obtain a first digital electrical signal; and the second digital signal processor is configured to process the first digital electrical signal to obtain the first data;

the second laser is configured to:
  transmit a part of emitted laser light to the first mixer in the first optical transceiver as second local oscillator light by using a second polarization-maintaining optical waveguide; and
  transmit another part of the emitted laser light to the second electro-optic modulator;

the second electro-optic modulator is configured to:
  load second data onto the laser light received from the second laser to obtain a second optical signal; and
  transmit the second optical signal to the first mixer in the first optical transceiver by using a second single-mode optical waveguide;

the first mixer is configured to mix the second local oscillator light with the second optical signal to obtain a mixed optical signal;

the first optical-to-electrical converter is configured to convert the mixed optical signal mixed by the first mixer into a second analog electrical signal;

the first analog-to-digital converter is configured to perform analog-to-digital conversion on the second analog electrical signal to obtain a second digital electrical signal; and the first digital signal processor is configured to process the second digital electrical signal to obtain the second data.

6. The coherent optical communications system according to claim 5, wherein the first laser is connected to the second optical receiver by using a circulator or a wavelength division multiplexer.

7. The coherent optical communications system according to claim 5, wherein a semiconductor optical amplifier-polarization controller (SOA-PC) is connected between the first laser and the second optical receiver, and wherein the SOA-PC is configured to:
  receive the first local oscillator light emitted by the first laser;
  divide the first local oscillator light into third local oscillator light in an X polarization state and fourth local oscillator light in a Y polarization state;
  rotate the polarization state of the fourth local oscillator light by 90 degrees;
  compare intensity of the third local oscillator light with intensity of rotated fourth local oscillator light; and
  select local oscillator light with higher intensity to output to the second optical receiver.

8. The coherent optical communications system according to claim 7, wherein comparing the intensity of the third local oscillator light with the intensity of the rotated fourth local oscillator light comprises:
  splitting a part of the third local oscillator light and a part of the rotated fourth local oscillator light based on a fixed proportion by using an optical splitter; and
  comparing the split part of the third local oscillator light and the split part of the rotated fourth local oscillator light to determine the intensity of the third local oscillator light and the intensity of the rotated fourth local oscillator light.

* * * * *